United States Patent
Lee

(10) Patent No.: US 9,222,609 B1
(45) Date of Patent: Dec. 29, 2015

(54) SEAL FOR USE IN SUBSEA CONNECTIONS AND SUBSEA CONNECTIONS EMPLOYING SUCH A SEAL

(71) Applicant: Teng P. Lee, Houston, TX (US)

(72) Inventor: Teng P. Lee, Houston, TX (US)

(73) Assignee: TRENDSETTER ENGINEERING, INC., Houston, TX (US)

( * ) Notice: Subject to any disclaimer, the term of this patent is extended or adjusted under 35 U.S.C. 154(b) by 390 days.

(21) Appl. No.: 13/856,054

(22) Filed: Apr. 3, 2013

(51) Int. Cl.
*F16L 23/16* (2006.01)
*F16L 23/20* (2006.01)
*F16J 15/08* (2006.01)

(52) U.S. Cl.
CPC ............. *F16L 23/20* (2013.01); *F16J 15/08* (2013.01); *F16L 23/162* (2013.01)

(58) Field of Classification Search
CPC ............ F16L 23/20; F16L 17/08; F16L 17/10; F16L 23/162
USPC ............. 285/96, 106; 277/641, 642, 645, 608
See application file for complete search history.

(56) References Cited

U.S. PATENT DOCUMENTS

| | | | | |
|---|---|---|---|---|
| 182,435 | A * | 9/1876 | Guyer | 285/334.2 |
| 1,567,813 | A * | 12/1925 | Oleson | 285/336 |
| 2,485,497 | A * | 10/1949 | Lemley et al. | 285/96 |
| 3,141,685 | A * | 7/1964 | Watts | 285/93 |
| 3,290,047 | A * | 12/1966 | Mayer | 277/647 |
| 4,214,763 | A * | 7/1980 | Latham | 285/336 |
| 4,410,186 | A * | 10/1983 | Pierce, Jr. | 285/336 |
| 5,149,148 | A * | 9/1992 | Taeuber et al. | 285/379 |
| 5,624,124 | A * | 4/1997 | Ungchusri et al. | 285/354 |
| 5,718,458 | A * | 2/1998 | Erstad | 285/96 |
| 7,025,360 | B2 * | 4/2006 | Walker et al. | 285/341 |
| 7,819,439 | B2 * | 10/2010 | Paton et al. | 285/341 |

* cited by examiner

*Primary Examiner* — David E Bochna
(74) *Attorney, Agent, or Firm* — Egbert Law Offices, PLLC

(57) ABSTRACT

A seal for use with a first coupling element and a second coupling element has an annular configuration. The seal has an inner wall and an outer wall. The seal has a first portion, a central portion and a second portion. The central portion extends outwardly of the first portion and the second portion. A channel is formed in the central portion so as to have one end opening to the outer wall at the first portion and an opposite end opening to the outer wall at the second portion. The seal is formed of a metallic material. The outer wall at the central portion has a generally V-shaped configuration.

17 Claims, 3 Drawing Sheets

SEAL FOR USE IN SUBSEA CONNECTIONS AND SUBSEA CONNECTIONS EMPLOYING SUCH A SEAL

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to seals for use in subsea applications. More particularly, the present invention the relates to metal-to-metal seals that are applied of the junctions between coupling elements or hubs in subsea application. Additionally, the present invention relates to seals that have multiple pressure-retaining contact points between outer surface of the seal and the inner surface of the coupling elements.

2. Description of Related Art Including Information Disclosed Under 37 CFR 1.97 and 37 CFR 1.98.

Metal-to-metal sealing is commonly used in subsea hydrocarbon production assemblies. For example, subsea wells typically have a subsea wellhead assembly at the seafloor with a subsea production tree mounted on the wellhead assembly. The tree has valves connected to flow lines for controlling the flow from the well. In another type of installation, a string of tieback conduits extend from the subsea wellhead assembly to a platform at the surface. A surface tree is mounted on the upper end of the tieback conduit. Some riser systems have inner and outer tieback conduits, each of which is run separately and connected by a tieback connector. The inner and outer tieback conduits make up the tieback riser in that type of system.

In each of these subsea connections, there is employed a first coupling element and a second coupling element. Typically, these coupling elements are referred to as "hubs". The hubs are joined together with the seal positioned at the interface of the hub so as to establish a strong liquid-tight connection therebetween. The seal is preferably a metal-to-metal seal such that it seals to an internal component of the subsea wellhead housing assembly. Metal-to-metal seals have a variety of configurations.

Elastomeric seals have been commonly used in the past. These elastomeric seals have certain disadvantages. In particular, these elastomeric seals have the inability to withstand the deteriorating effects of the subsea environment for extended periods of time. Additionally, the elastomeric seals tend to be unable to contain the higher pressures imposed on such hydraulic systems.

In the past, such metal seals have usually had a single pressure contact point with a surface of the first coupling element and a single surface contact point with another surface of the second coupling element. As a result, if this pressure contact point is parted under pressure, the seal will generally blowout and be lost. As such, each of these metal-to-metal seals has the inability to establish a back-up type of pressure connection whereby if a single seal contact point with a surface of the coupling element is lost, there remains a secondary pressure contact point within the coupling element. Additionally, such metal-to-metal seals can deform under the pressures applied thereto. When sufficient deformation occurs, the sealing relationship can be lost and leaks can occur. As such, there is a need to provide a metal-to-metal seal for subsea application which avoids the possibility of deformation and the resulting leakage and pressure loss.

In the past, various patents have issued relating to such metal-to-metal seals and relating to subsea coupling sealing connections. For example, U.S. Pat. No. 4,884,584, issued on Dec. 5, 1989 to R. E. Smith, describes a coupling having a metal-to-metal seal formed between a male member and a female member. The seal is pre-loaded by means of an internal preload mechanism. The male member engages the seal member so as to form the sealing relation between the two. The seal members are allowed to float, or slide, longitudinally within the bore of the female coupling member between an extended position and a compressed position. The seal member is biased by the preload mechanism into the extended position.

U.S. Pat. No. 5,385,169, issued on Jan. 31, 1995 to O. D. Odelius, describes a subsea fluid coupling employing metal-to-metal sealing. The subsea fluid coupling includes male and female parts which can be quickly connected and disconnected. The metal seals are carried by the female and male parts and engage planar metal surfaces to produce metal-to-metal sealing around the first and second passages when the coupling is connected or disconnected. Holes extend laterally through the gate and the conduit body, respectively, for creating a lateral pressure balance on the gate and conduit body.

U.S. Pat. No. 5,839,765, issued on Nov. 24, 1998 to Carter et al., discloses a metal seal ring for a tubular joint. The tubular joint has end hubs in opposed relationship and secured by a clamp. A primary seal ring has external tapered sealing surfaces engaging internal tapered sealing surfaces on the hubs to provide a primary seal. Secondary sealing surfaces on the hubs are engaged by O-rings to seal against external fluid flow to the seal ring. O-rings permit internal fluid flow outwardly from the seal ring.

U.S. Pat. No. 6,722,426, issued on Apr. 20, 2004 to Sweeney et al., teaches a gasket with multiple sealing surfaces. This gasket is a metal seal for a wellhead assembly that has upper and lower legs extending in opposite directions from each other and a rib extending radially outward from a junction of the legs. A first conical band on the upper leg extends uninterrupted from the rib a selected distance toward a tip of the upper leg. A second conical band on the upper leg extends uninterrupted from the tip of the upper leg toward the first conical band. An annular recess is located between the first and second conical bands.

U.S. Pat. No. 7,467,799, issued on Dec. 23, 2008 to O. D. Tarlton, provides a composite metal-to-metal seal having a core of relatively soft metal and an annular region of relatively soft metal. The seal is a ring having a pair of annular regions which provide tapered annular sealing surfaces for engaging respective sealing surfaces of mating hubs.

U.S. Pat. No. 7,819,439, issued on Oct. 26, 2010 to Paton et al., shows a fishtail bore seal. This bore seal serves to connect oil and gas tubular members. The bore seal has a fishtail profile which facilitates the use of resilient seals to provide resistance to external pressures in addition to the traditional metal-to-metal seal between the bore seal and the tubular members. A pressure relief valve is disposed within the bore seal to verify the integrity of the metal-to-metal seal with respect to internal bore pressure.

U.S. Pat. No. 8,096,560, issued on Jan. 17, 2012 to Pallini, Jr. et al., provides a metal-to-metal seal for a smooth bore for sealing contact with an opposing surfaces. The seal assembly includes an annular seal body with a sealing surface on one side of the seal body. An end of the sealing surface includes a sealing face for sealing contact with the opposing surface. The sealing surface also includes at least one support point that contacts the opposing surface when the seal is placed in sealing contact.

U.S. Pat. No. 8,226,089, issued on Jul. 24, 2012 to Pallini, Jr. et al., provides a seal assembly includes a tubular member having a longitudinal axis and a tubular member seal profile. A metal seal ring has a proximal base and a distal end that has a seal ring seal profile between the proximal base and distal end so as to contact the seal profile of the tubular member. A distal annular recess is in one of the seal profiles. The distal annular recess is spaced axially from the distal end of the seal ring so as to define a seal surface between the distal end of the seal ring and the distal annular recess that engages a seal surface of the seal profile of the tubular member. A proximal annular recess in one of the seal profiles is spaced axially from the distal annular recess so as to define a support area axially spaced from the metal-to-metal seal area.

European Patent No. 1373766, published on Jan. 2, 2004 to C. N. Crawford, describes an annular metal-to-metal sealing system which has a metal member defining an annular internal or external sealing surface. The annular seal body is composed of a high-strength metal material which is positioned in concentric relationship with the annular sealing surface and is sufficiently flexible to become spring-loaded during assembly. The annular seal body defines one or more annular seal retainer grooves each having an annular soft metal sealing inset therein with a portion thereof exposed for sealing engagement with the annular sealing surface. The spring-loaded characteristic of the annular seal body applies constant force to maintain the soft metal seal insert constantly energized sealing relation with the annular sealing surface.

U.S. Patent Publication No. 2004/0056432, published on Mar. 25, 2004 to Walker et al., provides a composite metal sealing ring for sealing between tubular members. Each of the tubular members has first and second conical inner sealing surfaces. A metal sealing ring has corrosion-resistant inlays defining opposing conical outer sealing surfaces for sealing with the first and second conical inner sealing surfaces.

U.S. Patent Publication No. 2007/0013146, published on Jan. 18, 2007 to J. A. Gariepy, shows a sealing ring for providing for sealing between truncated conical surfaces of adjoining members. The sealing ring includes an annular metal seal body having first and second truncated conical surfaces each for planar engagement with a truncated conical surface on a respective member. The annular sealing ring insert has a radially inward recess in the respective truncated conical body.

It is an object of the present invention to provide a subsea seal assembly that has dual seal points on each coupling element.

It is another object of the present invention to provide a subsea seal assembly that has high capacity and load compression.

It is another object of the present invention to provide a subsea seal assembly which provides a metal-to-metal seal.

It is still another object of the present invention to provide a subsea seal assembly that allows for the determination of the efficacy of the seal before pressurization.

It is another object of the present invention to provide a subsea seal assembly that allows for the subsea testing of the connection.

It is still a further object of the present invention to provide a subsea seal assembly that effectively maintains the seal in the event of failure of a portion of the seal assembly.

These and other objects and advantages of the present invention will become apparent from a reading of the attached specification and appended claims.

BRIEF SUMMARY OF THE INVENTION

The present invention is a seal for use with a first coupling element and a second coupling element in subsea applications. The seal of the present invention has an annular configuration. The seal has an inner wall and an outer wall. The seal has a first portion, a central portion and a second portion. The central portion extends outwardly of the first portion and the second portion. The seal has a channel formed in the central portion so as to have one end opening to the outer wall at the first portion and an opposite end opening to the outer wall at the second portion.

In the present invention, the seal is formed of a metallic material. The outer wall at the first portion of the seal has a first surface and a second surface. The first surface extends at an obtuse angle with respect to the second surface. One end of the channel opens to this second surface. The outer wall at the second portion of the seal has a third surface and a fourth surface. The third surface extends at an obtuse angle with respect to the fourth surface. The opposite end of the channel opens to the third surface. The second surface has a protrusion extends outwardly therefrom. This protrusion is suitable for receipt within a notch formed in one of the coupling elements. The outer wall of the central portion has a generally V-shaped configuration. The channel extends in transverse relationship to a diameter of the seal. The second surface and the third surface are in generally coplanar relationship.

In the present invention, the channel can comprise a plurality of channels extending through the central portion in spaced relationship to each other around a circumference of the seal. The inner wall of the seal has an arcuate inner surface such that an inner diameter of the seal is greatest in an area corresponding to the central portion.

The present invention is also a coupler apparatus that comprises a first coupling element having an interior passageway and an end, a second coupling element having an interior passageway and an end, and a seal positioned in the interior passageways of the first and second coupling elements adjacent the respective ends of the first and second coupling elements. The seal has an annular configuration. The seal has an inner wall and an outer wall. The seal has a first portion, a central portion and a second portion. The central portion extends outwardly of the first and second portions. The outer wall at the first portion bears against a wall of the interior passageway of the first coupling element. The outer wall at the second portion bears against a wall of the interior passageway of the second coupling element. The central portion is positioned at the ends of the first and second coupling elements.

This coupling apparatus of the present invention has a channel formed in the central portion of the seal so as to have one end opening to the outer wall at the first portion and an opposite end opening to the outer wall at the second portion.

The first coupling element has a port extending through a wall thereof. This port has an end opening to the outer wall of the seal at the first portion. The first coupler element has a notch formed in a wall surrounding the interior passageway thereof. The outer wall of the seal at the first portion has a protrusion extending outwardly therefrom. The protrusion is received in the notch of the first coupling element. The outer wall of the seal at the central portion has a generally V-shaped configuration. An apex of the V-shaped configuration is positioned at an interface of the ends of the first and second coupling elements. The seal is formed of a metallic material.

The first coupling element has a truncated conical portion adjacent the end of the first coupler element. The outer wall at the first portion of the seal has a first surface and a second surface. This first surface bears against the truncated conical portion of the first coupling element. The outer wall of the first portion of the seal at the first surface has an arcuate shape. The first coupling element also has a cylindrical portion formed between the truncated conical portion and the end of the first coupling element. The second surface of the seal has a cylindrical shape bearing against the cylindrical portion of the first coupling element. The first coupling element has a shoulder formed in the interior passageway inwardly of the end thereof. The second coupling element shoulder formed in the interior passageway inwardly of the end thereof. The seal is interposed between the shoulders of the first and second coupling elements.

This Section is intended to describe, in generality, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
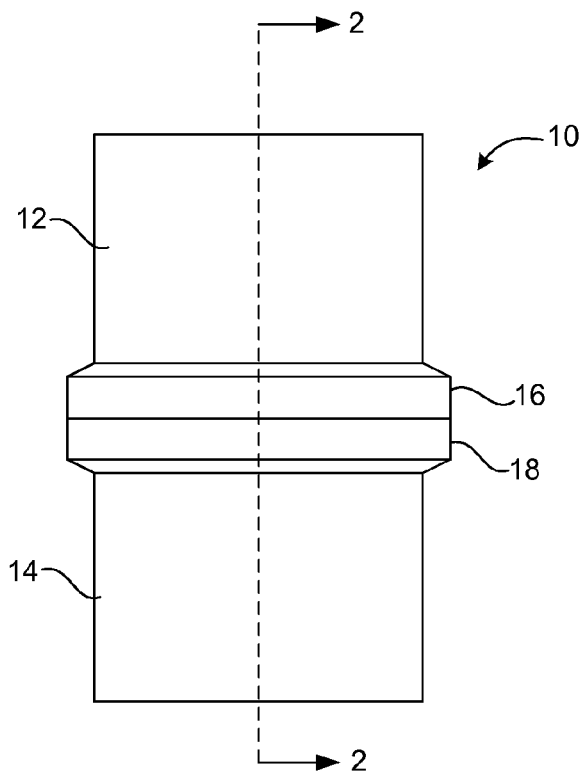
FIG. 1 is aside elevational view showing the coupling apparatus of the present invention.

Referring to FIG. 1, there is shown the subsea coupling apparatus 10 in accordance with the preferred embodiment of the present invention. The subsea coupling apparatus 10 includes a first coupling element 12 and a second coupling element 14. The first coupling element 12 has a hub 16 at an end thereof. The second coupling element 14 has a hub 18 at an end thereof. The hubs 16 and 18 will face each other so as to be joined together in surface-to-surface relationship. Each of the hubs 16 and 18 has a portion extending outwardly of the outer diameter of the coupling elements 14 and 16. In conventional application, a clamp will extend around the hub 16 and 18 so as to securely join the coupling elements 12 and 14 together.

Figure 2:
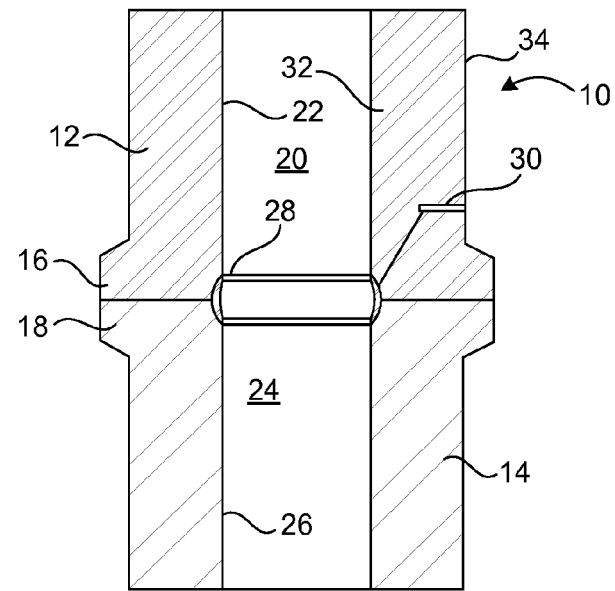
FIG. 2 is a cross-sectional view as taken across lines 2-2 of FIG. 1 showing the coupling apparatus of the present invention.

FIG. 2 is a cross-sectional view of the coupling apparatus 10 of the present invention. As can be seen, the first coupling element 12 has an interior passageway 20 extending centrally therethrough. A wall 22 extends around the interior passageway 20. The hub 16 is formed at the end of the coupling element 12. The second coupling element 14 has an interior passageway 24 having a wall 26 extending therearound. The interior passageway 24 extends longitudinally through the coupling element 14. The hub 18 is formed at the end of the coupling element 14 so as to be positioned in surface-to-surface contact with the hub 16 associated with the first coupling element 12.

Importantly, in FIG. 2, an annular seal 28 will be received within the interior of each of the coupling elements 12 and 14. In particular, a suitable cut-out area is formed in each of the hubs 16 and 18 so as to properly receive the seal 28 therein. The seal 28 is suitably annular so that the interior of the seal 28 will allow the interior passageways 20 and 24 to communicate with each other. The outer walls of the seal 28 will bear against the interior surfaces of the hubs 16 and 18 so as to establish a seal therewith. The seal 28 is formed of a metallic material so as to establish a strong metal-to-metal seal against the inner surfaces of the hub 16 and 18.

In FIG. 2, it can be seen that there is a test port 30 that extends through the wall 32 of the first coupling element 12. The test port 30 has one end opening to the outer surface 34 of the first coupling element 12. The port 30 extends through the wall 32 so as to have an opposite end opening to the outer surface of the seal 28. As will be described hereinafter, the test port 30 allows pressures to be introduced toward the seal 28 so as to test the effectiveness and efficacy of the sealed connection between the seal 28 and the interior surfaces of the hubs 16 and 18. This pressurization can occur before the interior passageways 20 and 24 of the coupling apparatus 10 are pressurized. As such, the present invention allows for proper subsea testing of the connection before any pressures are applied.

Figure 3:
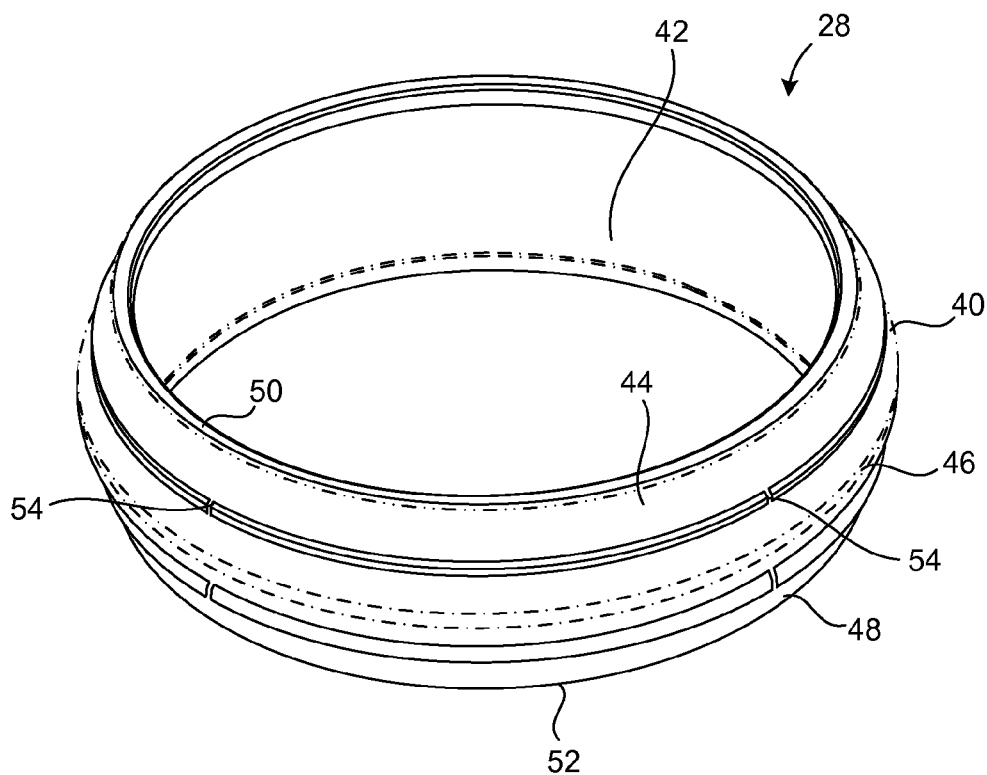
FIG. 3 is an isolated perspective view of the annular seal of the present invention.

FIG. 3 shows a perspective view of the seal 28. As can be seen, the seal 28 is of an annular configuration. The seal 28 has an outer wall 40 and an inner wall 42. The seal will have a first portion 44, a central portion 46 and a second portion 48. The first portion 44 extends from an end 50 of the seal 28. The second portion 48 extends inwardly from an end 52 of the seal 28. The central portion 46 is positioned between the first portion 44 and the second portion 48. The second portion 48 extends outwardly of the first portion 44 and the second portion 48.

Importantly, in FIG. 3, it can be seen that there are channels 54 that are formed in the central portion 46 so as to have one end opening to the outer wall 40 at the first portion 44 and an opposite end opening to the outer wall 40 at the second portion 48. The channels 54 extend in transverse relationship to the diameter of the seal 28. The channels 54 are in spaced relationship to each other around the circumference of the annular seal.

Figure 4:
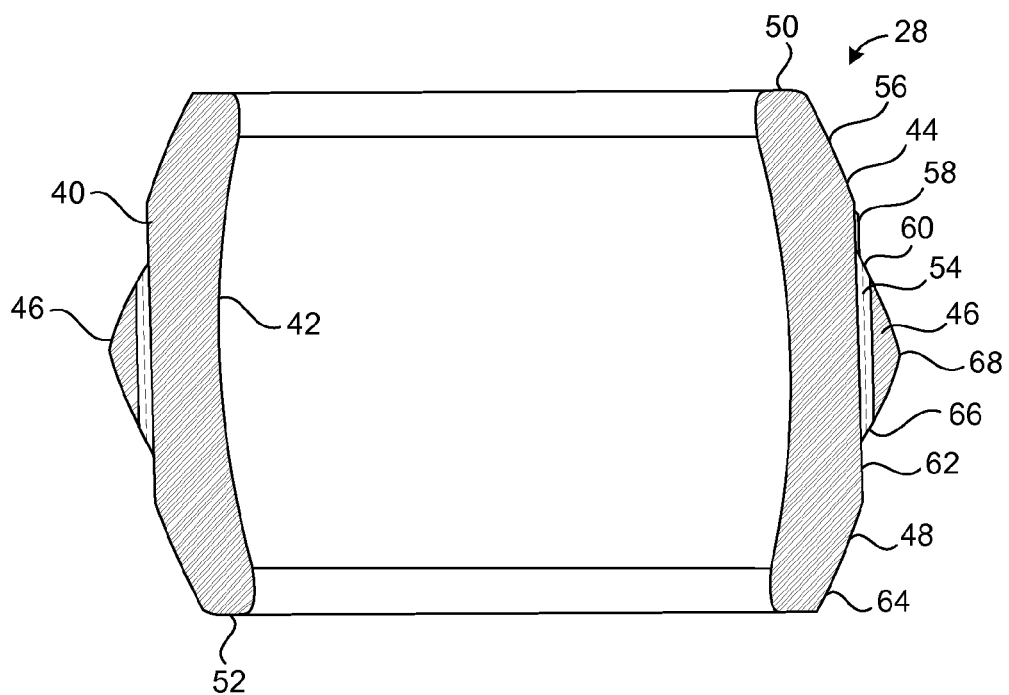
FIG. 4 is a cross-sectional view of the annular seal of the present invention.

FIG. 4 is a cross-sectional view of the annular seal 28. In particular, the seal 28 has ends 50 and 52. Ends 50 and 52 are generally flat so that they can properly abut shoulders formed on the inner surface of the coupling elements 12 and 14 (as will be described hereinafter). The seal 28 has an outer surface 40 and an inner surface 42. In the cross-sectional view shown in FIG. 4, it can be seen that the cross section of the sides of the seal 28 have a generally boomerang shape. As such, the inner surface 42 has an arcuate inner surface such that the inner diameter of the seal 28 is greatest in the area corresponding the central portion 46.

The first portion 44 extends from the end 50. The first portion 44 has a first surface 56 and a second surface 58. The first surface 56 extends at an obtuse angle with respect to the second surface 58. The channel 54 that is formed in the central portion 46 has an end 60 that will open to the second surface 58 of the first portion 44.

The second portion 48 has a third surface 62 and a fourth surface 64. The third surface 62 extends at an obtuse angle with respect to the fourth surface 64. The opposite end 66 of the channel 54 opens to the third surface 62 of the second portion 48.

The central portion 46 has a generally V-shaped configuration. In other words, the central portion 46 extends outwardly of the first portion 44 and the second portion 48. This generally "V-shaped configuration" can include a variety of similar structures, such as U-shaped structures and truncated triangular shapes. Ultimately, the apex 68 extends outwardly so as to generally reside at the interface between the hubs 16 and 18 of the coupling elements 12 and 14.

Figure 5:
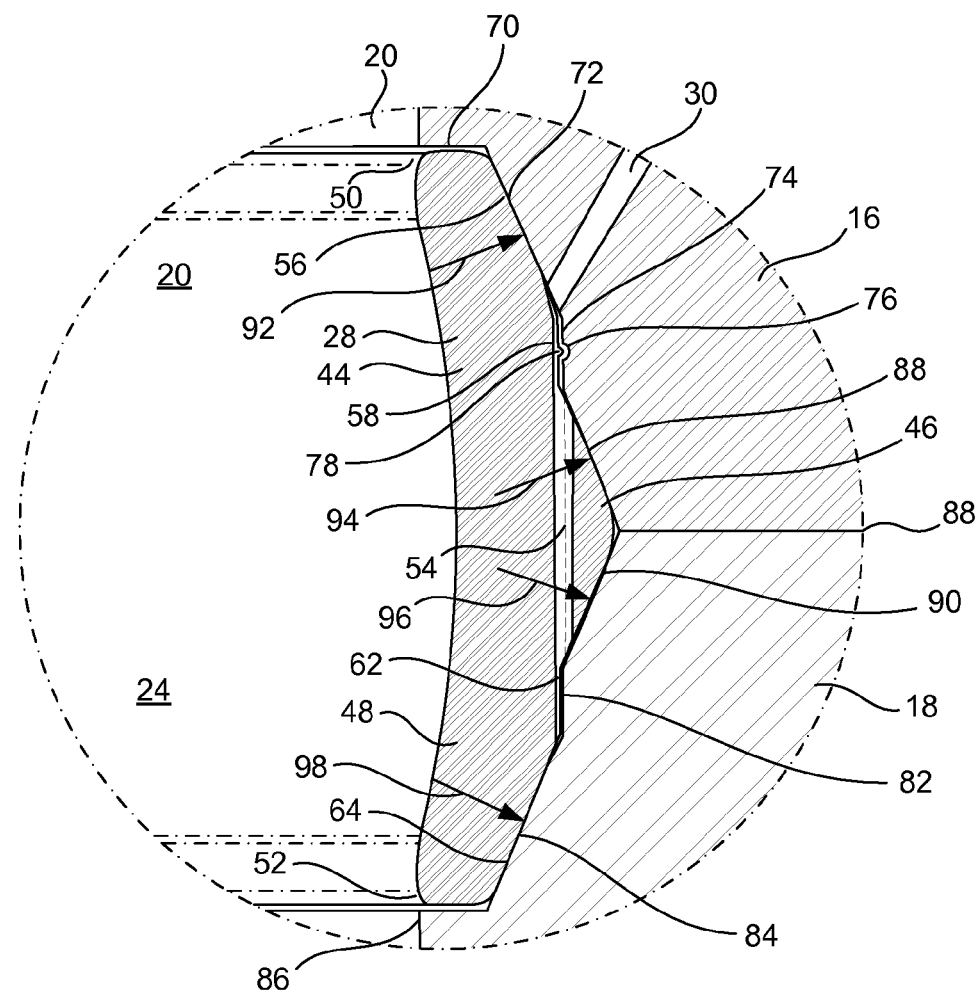
FIG. 5 is a detailed cross-sectional view of the annular seal of the present invention as applied against the surfaces of the coupling elements and showing, in particular, the pressure contact points between the annular seal and the inner surfaces of the coupling elements.

FIG. 5 shows the relationship between the annular seal 28 and the inner surfaces of the hubs 16 and 18 of the respective coupling elements 12 and 14. Initially, it can be seen that the hub 16 includes a shoulder 70 that is formed adjacent to the interior passageway 20. Shoulder 70 extends inwardly so as to bear against the flat end surface 50 of the annular seal 28. The hub 16 includes an inclined inner surface 72 which will bear against the first surface 56 of the first portion 44 of the seal 28. The first surface 56 has a generally truncated conical shape so as to match the truncated conical shape of the inclined surface 72. The second surface 58 has a generally cylindrical shape so as to bear against the generally cylindrical surface 74 formed in the hub 16 of the first coupling element 12.

Importantly, in FIG. 5, it can be seen that the test port 30 will extend so as to have an end opening toward the first portion 44. In particular, the test port 30 will open to the first surface 56 of the first portion 44. As a result of this configuration, pressures can be applied through the test port 30 to assure that a proper surface-to-surface sealing relationship is established between the first surface 56 and the inclined surface 72.

Also, in FIG. 5, it can be seen that the hub 16 has a notch 76 formed circumferentially around an inner wall thereof. The second surface 58 has a protrusion 78 extending outwardly therefrom. The protrusion 78 is received within the notch 76. As such, this establishes a positive point of connection for the assembly of the seal 28 within the hub 16 of the coupling element 12.

In normal use, the first portion 44 of the seal 28 is installed within the hub 16 in a surface location. The first portion 44 of the seal 28 is installed by inserting the first portion 44 into the interior of the hub 16. Once the protrusion 78 is received within the notch 76, the assembler will know that a proper connection is established between the seal 28 and the inner surfaces of the hub 16. The first coupling element 12 can then be placed into the water. The seal 28 will have the second portion 48 extending outwardly therefrom. The hub 18 can then be installed over the second portion 48 and then clamped against the hub 16. If subsea repair is necessary, the connection between the protrusion 78 and the notch 16 would allow the seal 28 to be removed subsurface. The clamp around the hubs 16 and 18 can be removed, the hub 18 and its associated coupling element 14 removed from the hub 16, and then a subsea apparatus, such as an ROV, can grasp the second portion 48 so as to release the seal 28 from engagement within the interior of the hub 16. As such, the present invention is able to facilitate subsea repair of the sealing apparatus.

The second portion 48 has its third surface 62 bearing against a cylindrically-shaped surface 82 in the hub 18. The third surface 62 will be in generally co-planar relationship with the second surface 58 of the first portion 44. The fourth surface 64 will bear against the inclined surface 84 on the inner surface of the hub 18. The fourth surface 64 is of a truncated conical shape. As such, it will bear against the truncated conical shape of the inclined surface 84. The end 52 of the seal 28 will reside against a shoulder 86 extending inwardly from the hub 18. As can be seen, the seal 28 will be sandwiched between the shoulders 70 and 86 so as to be properly retained therebetween.

The central portion 46 is positioned at the interface 88 between the hubs 16 and 18. As such, the outer surface of the central portion 46 will bear against an inclined surface 88 formed in the hub 16 and against an inclined surface 90 formed in the hub 18. It can be seen that the channel 65 extends through the central portion 46 so as to have one end opening at the interface between the second surface 58 and the cylindrical surface 74 of the hub 16 and an opposite end opening to the interface between the third surface 62 of the seal 28 and the cylindrical surface 82 of the hub 18.

Importantly, the use of the channel 54 facilitates the ability to establish multiple pressure contact points between the sealing surface of the seal 28 and the surfaces of the hubs 16 and 18. Arrows 92, 94, 96 and 98 illustrate these contact points. Importantly, the contact point 92 is established between the slightly arcuate first surface 56 of the seal 28 and the truncated conical surface 72 of the hub 16. As such, when pressures flow through the interior passageway 20 of the first coupling element 12, these pressures will be exerted against the inner wall 42 of the seal 28 so as to establish the pressure point 92. It should be noted that the strongest amount of pressure can be established in metal-to-metal sealing relationships by the joinder of an arc-shaped or spherical surface against a relatively straight surface. As such, the slightly arcuate shape of the first surface 56 will establish this extremely strong sealing connections with the relatively straight inclined surface 72 of the hub 16.

Arrow 94 shows another pressure point that is established between the central portion 46 of the seal 28 and the inclined surface 88 of the hub 16. Arrow 94 shows a pressure point between another surface of the central portion 46 and the inclined surface 90 of the hub 18. The arrow 98 shows another pressure point between the fourth surface 64 of the seal 28 and the inclined surface 84 of the hub 18. It can be seen that the second portion 48 has an identical configuration to that of the first portion 44. As such, the same curved surface/straight surface relationship is established.

Importantly, during normal use, when a fluid is flowing under pressure through the interior passageways 20 and 24, the force of this fluid will urge the outer wall 40 of the seal 28 against the interior surfaces of the hubs 16 and 18. Under normal use, the force exerted by the pressure point indicated by arrow 92 would prevent any pressure release or leakage through the surfaces between the first portion 44 and the interior surfaces of the hub 16. However, if, by circumstance, a leakage or loss of pressure would occur, this flow would pass between the surfaces of the first portion 44 and the inner surfaces of the hub 16 so as to flow into the channel 54. As such, the resulting pressurized fluid will further urge the central portion 46 in to sealing relationships against the inclined surfaces 88 and 90 of the respective hubs 16 and 18. As a result, the force of the fluid flowing through the interior passageways 20 and 24 will further establish a secondary or back-up sealing relationship. As such, no loss in pressure within the interior passageways 20 and 24 will occur. The flow of fluid through the channel 94 will enhance the pressure at the pressure points 94 and 96 so as to establish a strong seal therewith. As such, there will be no leakage of fluid or loss of pressure at the interface 88 between the hubs 16 and 18.

Similarly, if the seal at the pressure point 94 should be breached, then any flow of fluid between the fourth surface 64 and the inclined surface 84 of the hub 18 would flow in the area between the cylindrical surfaces 62 and 82 and into the channel 54. Once again, this would pressurize the central portion 46 so as to further establish the strong sealing relationship at the pressure point indicated by arrow 96. As a result, there would be no pressure loss nor fluid leakage at the interface 84. As a result, the configuration of the present invention can establish a strong sealing relationship at two separate locations for each of the hubs 16 and 18.

It should be noted that if leakages should occur at the interface 84 such that subsea pressures should pass through the interface toward the seal 28, the "boomerang" configuration the seal 28 would further prevent any subsea pressures from adversely affecting the pressurized fluid within the interior passageways 20 and 24. In other words, the pressure pass through the interface 84 would tend to compress the central portion 46 inwardly so as to cause the subsea pressurized fluid to flow past the surfaces of the central portion 46. This would cause the boomerang-shape of the seal 28 to flex in a manner such that greater pressures would then be exerted at the pressure points indicated by arrow 92 and 94 as a result of the pressurized fluid within the interior passageways 20 and 24. As such, the present invention would provide a superior seal against any possible flow of subsea pressures from the exterior of the connector apparatus toward the interior thereof.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An article for use with a first coupling element and a second coupling element, the article comprising:
   a seal having an annular configuration, said seal having an inner wall and an outer wall, said seal having a first portion and a central portion and a second portion, said central portion extending outwardly of said first portion and said second portion, said seal having a channel formed in said central portion so as to have one end opening to said outer wall at said first portion and an opposite end opening to said outer wall at said second portion, the outer wall at said first portion of said seal having a first surface and a second surface, said first surface extending at an obtuse angle with respect to said second surface, said one end of said channel opening to said second surface, said second surface having a protrusion extending outwardly therefrom, said protrusion suitable for receipt within a notch formed in the first coupling element.

2. The article of claim 1, said seal being formed of a metallic material.

3. The article of claim 1, the outer wall at said second portion of said seal having a third surface and a fourth surface, said third surface extending at an obtuse angle with respect to said fourth surface, said opposite end of said channel opening to said third surface.

4. The article of claim 3, said second surface and said third surface being in generally coplanar relationship.

5. The article of claim 1, said outer wall at said central portion having a generally V-shaped configuration.

6. The article of claim 1, said channel extending in transverse relation to a diameter of said annular seal.

7. The article of claim 1, said channel comprising a plurality of channels extending through said central portion in spaced relationship to each other around a circumference of said seal.

8. An article for use with a first coupling element and a second coupling element, the article comprising:
   a seal having an annular configuration, said seal having an inner wall and an outer wall, said seal having a first portion and a central portion and a second portion, said central portion extending outwardly of said first portion and said second portion, said seal having a channel formed in said central portion so as to have one end opening to said outer wall at said first portion and an opposite end opening to said outer wall at said second portion, said inner wall of said seal having an arcuate inner surface such that an inner diameter of said seal is greatest in an area corresponding to said central portion.

9. An apparatus comprising:
   a first coupling element having an interior passageway and an end;
   a second coupling element having an interior passageway and an end; and
   a seal positioned in the interior passageways of said first and second coupling elements adjacent the ends of said first and second coupling elements, said seal having a annular configuration, said seal having an inner wall and an outer wall, said seal having a first portion and a central portion and a second portion, said central portion extending outwardly of said first portion and said second portion, the outer wall at said first portion bearing against a wall of said interior passageway of said first coupling element, the outer wall at said second portion bearing against a wall of said interior passageway of said second coupling element, said central portion positioned at the ends of said first and second coupling elements, said first coupler element having a notch formed in a wall of said coupling element surrounding said interior passageway, said outer wall of said seal of said first portion having a protrusion extending outwardly therefrom, said protrusion being received in said notch of said first coupling element.

10. The apparatus of claim 9, said seal having a channel formed in said central portion so as to have one end opening to said outer wall at said first portion and an opposite end opening to said outer wall at said second portion.

11. The apparatus of claim 9, said first coupling element having a port extending through a wall thereof, said port having an end opening to said outer wall of said seal at said first portion.

12. The apparatus of claim 9, said outer wall of said seal at said central portion having a generally V-shaped configuration, an apex of the V-shaped configuration positioned at an interface of the ends of said first and second coupling elements.

13. The apparatus of claim 9, said seal being formed of a metallic material.

14. The apparatus of claim 9, said first coupling element having a truncated portion adjacent said end of said first coupler element, said outer wall at said first portion of said seal having a first surface and a second surface, said first surface bearing against said truncated portion of said first coupling element, said outer wall of said first portion of said seal at said first surface having an arcuate shape.

15. The apparatus of claim 14, said first coupling element having a cylindrical portion formed between said truncated portion and said end of said first coupling element, said second surface of said seal having a cylindrical shape bearing against said cylindrical portion of said first coupling element.

16. The apparatus of claim 9, said first coupling element having a shoulder formed in said interior passageway inwardly of the end thereof, said second coupling element having a shoulder formed in said interior passageway inwardly of the end thereof, said seal being interposed between the shoulders of said first and second coupling elements.

17. The apparatus of claim 9, said inner wall of said seal having an arcuate inner surface such that an inner diameter of said seal is greatest in an area corresponding to said central portion of said seal.

* * * * *